United States Patent [19]
Suzuki et al.

[11] Patent Number: 5,440,085
[45] Date of Patent: Aug. 8, 1995

[54] LEVER SWITCH ASSEMBLY

[75] Inventors: Taketoshi Suzuki; Kazumi Honjo, both of Tokyo, Japan

[73] Assignee: Niles Parts Co., Ltd., Japan

[21] Appl. No.: 251,369

[22] Filed: May 31, 1994

[30] Foreign Application Priority Data

Mar. 30, 1994 [JP] Japan ................. 6-083914

[51] Int. Cl.[6] .................................... H01H 9/00
[52] U.S. Cl. ..................... 200/61.54; 200/4; 200/61.27
[58] Field of Search ............ 200/4, 61.27–61.38, 200/61.54–61.57

[56] References Cited

U.S. PATENT DOCUMENTS

| | | | |
|---|---|---|---|
| 3,892,932 | 7/1975 | Erdelitsch et al. | 200/61.27 |
| 3,940,579 | 2/1976 | Buhl et al. | 200/4 |
| 4,273,971 | 6/1981 | Tregurtha | 200/4 |
| 4,376,878 | 3/1983 | Iwata et al. | 200/61.27 |
| 4,543,456 | 9/1985 | Iwata et al. | 200/61.54 |
| 5,182,422 | 1/1993 | Botz et al. | 200/61.54 |
| 5,182,423 | 1/1993 | Botz et al. | 200/61.54 |
| 5,196,662 | 3/1993 | Hoffman | 200/61.54 |
| 5,200,584 | 4/1993 | Nagaya | 200/4 |

FOREIGN PATENT DOCUMENTS 1-106042 7/1989 Japan .................... H01H 25/04

*Primary Examiner*—J. R. Scott
*Attorney, Agent, or Firm*—Ronald P. Kananen

[57] ABSTRACT

A lever switch assembly features an operation lever which has one end disposed in a hollow or cavity defined in a movable switch element and is pivotally supported thereon by two boss-like lugs which project out from opposite sides of the lever. The lugs are received in blind bores formed in springy finger-like projections which form part of the movable switch element. The movable switch element is housed in a case and pivotally supported thereon so as to be rotatable about an axis which is normal to the axis about which the operation lever is pivotal. A pair of electrodes which is disposed on the operation lever is arranged to remain in constant contact with intermediate contacts which are supported on the movable switch element, irrespective of the pivotal movement of the lever. The intermediate contacts maintain a constant electrical connection between the electrodes on the lever and electrodes which are provided on the case. The movable switch element is provided with sliding switch contacts which are arranged to establish connection between pairs of stationary electrodes or contacts which are arcuately arranged on a portion of the case.

14 Claims, 3 Drawing Sheets

LEVER SWITCH ASSEMBLY

BACKGROUND OF THE INVENTION

1. Field of the Invention

The present invention relates to a so-called lever switch. More specifically, the present invention relates to such a lever operated switch such as is used to control windshield wipers, washer pumps for injecting a washing liquid, vehicle turn indicators, vehicle head lights and a passing indicators, and so forth.

2. Description of the Related Art

Japanese Utility Model Publication Laid-Open No. 1-106042 discloses a switch that is operated by a lever which has a movable member at its end point and which is pivotally mounted on a moving switch element through a supporting pin.

However, with this type of switch it is necessary to provide a supporting pin for mounting the operation lever on the switch base. This inevitably increases the number of parts and the time required to assemble the device. Moreover, when a malfunction occurs and repair become necessary, the provision of the supporting pin renders it difficult to disassemble the switch without damaging it. In addition, a relatively long time is necessary to disassemble the switch, which lowers the efficiency with which work can be carried and thus increases labor costs.

Moreover, in the above type of switch, the operation lever has been electrically connected to a terminal mounted on the case by way of soldering. Therefore, a relatively high level of soldering skill is required during both assembly and disassembly. This further increases the amount of time and skill with is required to assemble the device during initial fabrication and the amount of time required for re-assembly after repair work has been carried out on a dissembled unit.

SUMMARY OF THE INVENTION

The present invention has been proposed in order to overcome the above mentioned drawbacks.

Accordingly, it is an object of the present invention to provide a lever switch assembly in which the number of parts are reduced, and its assembly and disassembly can be easily made in a short period of time.

It is a further object of the present invention to provide a lever switch which can be disassembled without damage and which obviates soldering operations during disassembly and reassembly.

In brief, the above objects are achieved by a lever switch assembly wherein an operation lever, which has one end disposed in a hollow or cavity defined in a movable switch element, is pivotally supported on the movable switch element by two boss-like lugs which project out from opposite sides of the lever. The lugs are received in blind bores formed in springy finger-like projections which form part of the movable switch element. The movable switch element is housed in a case and pivotally supported thereon so as to be rotatable about an axis which is normal to the axis about which the operation lever is pivotal. A pair of electrodes, which is disposed on the operation lever, is arranged to remain in constant electrical contact with contacts supported on the case, irrespective of the pivotal movement of the lever through the use of a sliding contact arrangement.

More specifically, a first aspect of the present invention resides in a lever switch assembly comprising: a case; a movable switch element disposed in the case and pivotally supported on the case so as to be pivotal about a first axis, the movable element having a space or void; and an operating lever having an end portion received in the space, the operating lever being pivotally supported on the movable switch element by first and second lug members which are coaxially arranged and which extend out from either side of the operating lever so as to be pivotal about a second axis which has a predetermined angled relationship with the first axis.

In accordance with the first aspect of the invention, the movable switch element has a pair of resilient supporting portions which are formed with blind bores in which the first and second lugs are rotatably received, and which therefore support the operation lever so as to be pivotal about the second axis.

The pair of resilient supporting portions comprise finger-like members which extend along opposite sides of the movable switch element to an accessible level proximate an opening therein through which the operating lever passes into the space. The movable switch element has a projection which is received in an opening formed in an upper portion of the case, and which supports the movable switch element in the case so as to be pivotal about the first axis.

A second aspect of the invention resides in a lever switch assembly comprising: a manually operable lever, the lever having a pair of cylindrical boss-like support lugs extending from its side surfaces; a movable switch element having a cavity or space into which an end portion of the lever can extend, the movable switch element supporting the pair of support lugs in a manner which renders the lever pivotal about a first axis with respect to the movable switch element; and a case in which the movable switch element is supported so as to be pivotal about a second axis; a first electrical conductor supported on the casing; and a second electrical conductor supported on the lever, the second electrical conductor having a portion which is exposed proximate the pair of support lugs and which is in constant electrical contact either directly or indirectly with the first electrical conductor.

In accordance with the second inventive aspect, a embodiment is such that the movable switch element has an intermediate conductor member which is arranged to be in constant contact with the first electrode and to be in constant sliding engagement with the second electrode irrespective of the pivotal movement of the operation lever.

In second and third embodiments of the invention, at least one of the first and second conductors is resilient and maintains contact with the other of the first and second conductors irrespective of the pivotal movement of the operation lever about the first axis.

A fourth embodiment of the invention features an arrangement wherein one of the first and second contacts is a male plug type terminal element and the other of the first and second contacts is a female plug type terminal.

BRIEF DESCRIPTION OF THE DRAWINGS

The various advantages and merits of the present invention will become more clearly appreciated as a detailed description of the preferred embodiments is given with reference to the appended drawings in which.

DETAILED DESCRIPTION OF THE PREFERRED EMBODIMENTS

Figure 1:
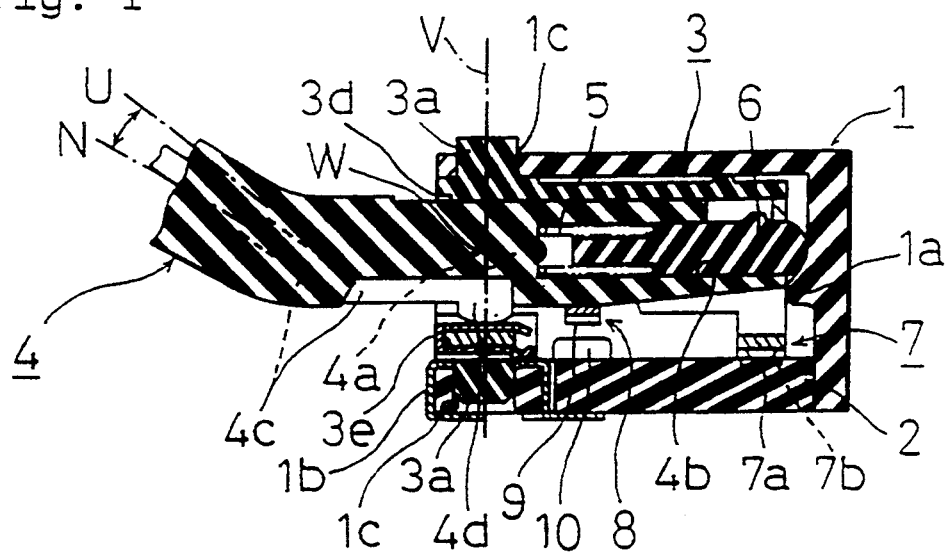
FIG. 1 is a schematic sectional view showing a first embodiment of the present invention.

FIGS. 1 to 5 show details of a first embodiment of the present invention. The first embodiment relates to a lever switch used, by way of example, for controlling automotive windshield wipers, head and tail lights and like types of devices.

The lever switch according to the first embodiment is composed of a manually manipulable operation lever 4 having a pair of opposed, integral, coaxially-aligned first cylindrical boss-like support lugs 4a which respectively project outwardly from its side surfaces, a movable switch element 3 which encloses the end of the lever 4, and a case 1 for supporting and enclosing the movable switch element 3.

The movable switch element 3 has a pair of opposed, resilient, finger-like supporting portions 3b which extend along the opposite sides of the switch element. These supporting elements 3b are each formed with blind bores 3c (FIG. 2) which respectively receive the first cylindrical boss-like support lugs 4a of the operation lever 4, and thus support the operation lever 4 in a manner wherein it is pivotal about a first axis W. Due to the resilient nature of the supporting portions 3b, quick and easy assembly and disassembly of the arm 4 and the movable switch element 3 is facilitated.

The resilient supporting portions 3b are arranged to extend to the vicinity of an opening 3d formed in the outboard end of the movable switch element 3 and thus provide access which allows the supporting portions to be pried apart and thus facilitate the ready disconnection of the operation lever 4 from the movable switch element 3.

Figure 5:
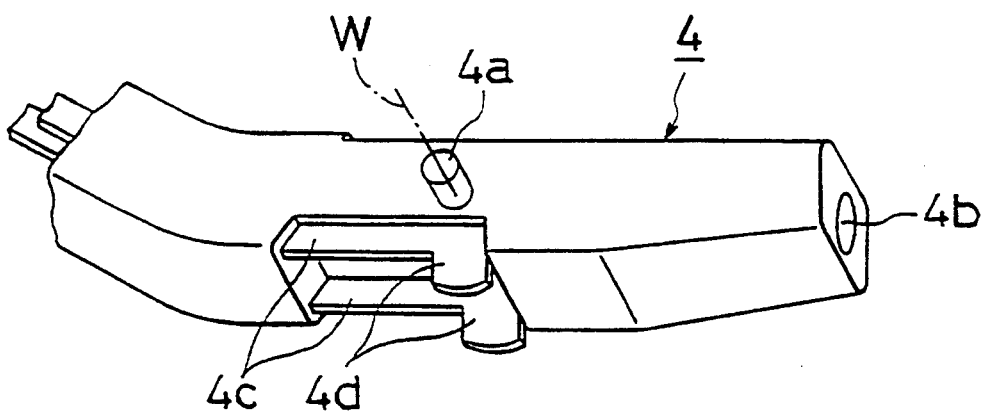
FIG. 5 is a perspective view showing the operation lever shown in FIG. 4.

As shown in FIG. 5, the operation lever 4 has a pair of parallel electric conductors 4c embedded therein. These electric conductors 4c have projections 4d which respectively extend out from the electric conductors 4c in the vicinity of the first cylindrical boss-like support lugs 4a about which the operation lever 4 is pivotal.

The movable switch element 3 has a pair of intermediate conductors 3e adapted to establish constant electrical contact between the pair of the contacts 4d mounted on the operation lever 4 and electrodes 1b which are mounted on the case 1. As will be appreciated from FIG. 5, each end of the contacts 4d is curved, i.e. forms a part of a circle having a center which is concentric with the first axis W of the first cylindrical boss-like support lugs 4a. With this arrangement, the contacts 4d of the operation lever 4 can slide over and remain in good electrical contact with the intermediate conductors 3e, even the operation lever 4 is pivotally moved.

The movable switch element 3 is formed with a second cylindrical boss 3a. The case 1 has an opening 1c in its upper portion which is arranged to received the cylindrical boss 3a, and therefore pivotally support the operation lever 4 so that it is pivotal about a second axis V. The second axis V extends in a direction perpendicular to the first axis W.

The case 1 has a base plate 2 at its lower portion. The movable switch element 3 is installed in a space or hollow formed between the upper portion of the case 1 and the base plate 2 and, in this embodiment, includes a wiper switch 7 and a washer switch 8.

Figure 3:
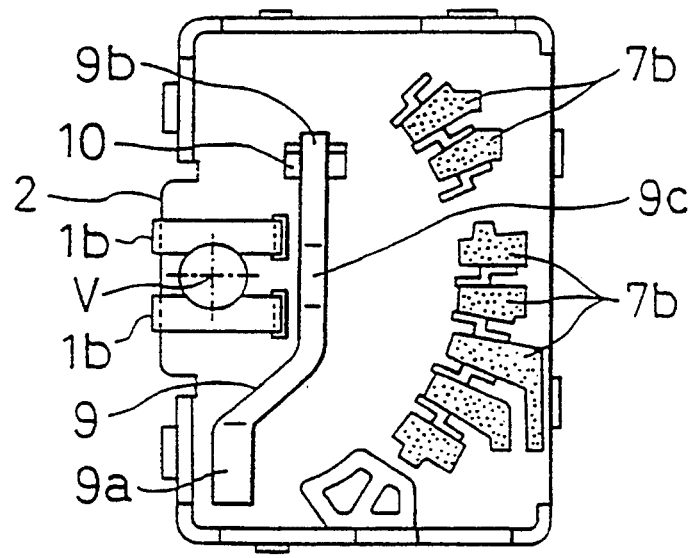
FIG. 3 is a schematic plane view showing a base plate used in the first embodiment.

As shown in FIG. 3, the wiper switch 7 is formed as a so-called slide switch and is composed of a plurality of movable contacts 7a which are disposed on the lower surface of the movable switch element 3 and a plurality of fixed contacts 7b which is disposed on the upper surface of the base plate 2. The contacts 7a and 7b are arranged along an arcuate line having the second axis V as its center.

On the other hand, the washer switch 8 is composed of a movable contact 9 and a fixed contact 10 mounted on the base plate 2.

The movable contact 9 is made of springy material which exhibits electrical conductivity as well as elasticity. One end 9a of this contact (see FIG. 3) is fixed on the base plate 2 and another end, i.e. the free end 9b thereof is located over the fixed contact 10 to form a cantilever type arrangement. The intermediate portion 9c of this arrangement is pressed by the lower portion of the lever 4 and moved in the direction indicated by arrow u when the operation lever 4 pivots in the direction indicated by arrow U in FIG. 4, thereby establishing an electrical connection between the free end 9b and the fixed contact 10.

The operation lever 4 is formed with an axially extending bore 4b which opens the end which is enclosed by the case 1. The bore 4b receives a reciprocal pin 6 and a compression spring 5 which bias the pin 6 in a manner to project out of the bore 4b. This maintains the end of the pin 6 in contact with a projection 1a formed in an inner wall of the case 1, and in a manner wherein an operator manipulating the lever 4, is provided with a click motion or detente feeling when the operation lever 4 is moved in a direction which closes the washer switch 8.

Figure 2:
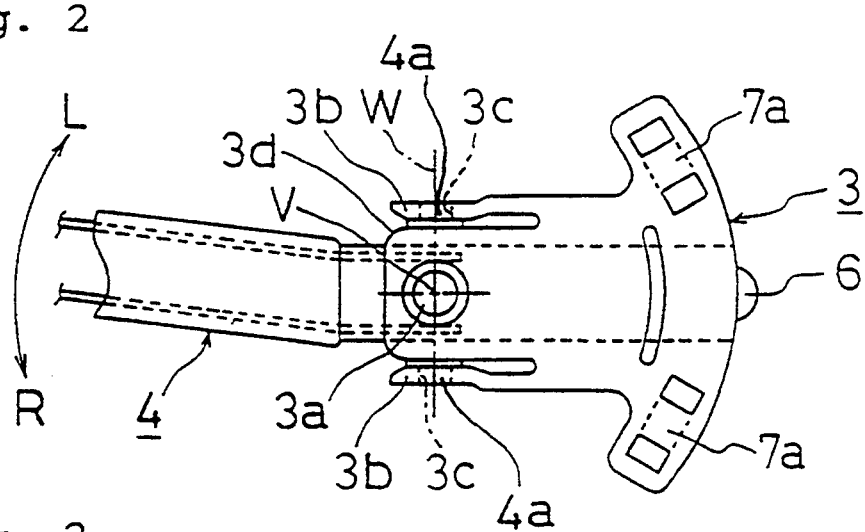
FIG. 2 is a schematic view showing a bottom surface of an operation lever and a switch member used in the first embodiment.
Figure 4:
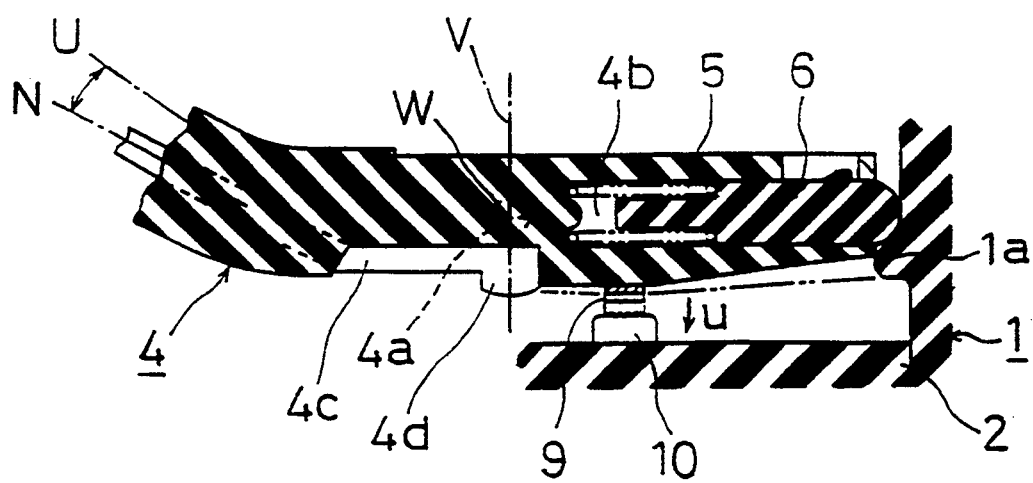
FIG. 4 is an enlarged schematic sectional view showing the operation lever and a washer switch according to the first embodiment of the invention.

The operation of the lever switch is such that if the operation lever 4 is moved in the direction L or R as shown in FIG. 2, the movable switch element 3 also moves according to the motion of the operation lever 4. Therefore, the movable contact 7a is brought into electrical contact with the fixed contact 7b to turn the wiper switch ON. At this time, the washer switch 8 is in an OFF-state since the operation lever 4 is located in the neutral position N as shown in FIG. 4. However, if the operation lever 4 is moved in the direction U, the free end 9b of the movable contact 9 is electrically connected to the fixed contact 10, thereby actuating the washer switch 8. If the lever 4 is released, the reaction which is produced between by the pin 6 and the projection 1a, automatically returns the operation lever 4 to its neutral position N and the washer switch 8 is accordingly again returned to its OFF-state.

SECOND EMBODIMENT

Figure 6:
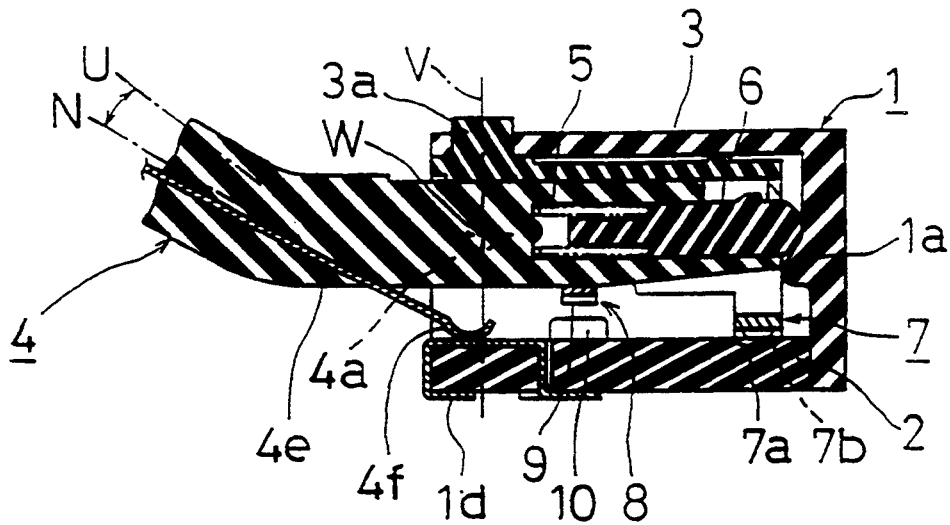
FIG. 6 is a schematic sectional view showing a second embodiment of the present invention.

FIG. 6 shows a second embodiment of the present invention. In the second embodiment, an electric conductor 4e is embedded in the operation lever 4. A part of this electric conductor 4e is exposed in the vicinity of the first contact portion 4a to form a contact 4f. The contact 4f has sufficient elasticity that a constant connection between the electrode 1d mounted on the case 1 and the contact 4f is maintained irrespective of the pivoting of the operation lever 4. Other than this, the remaining construction is essentially the same as in the first embodiment and as such a redundant description of the same will be omitted for brevity.

THIRD EMBODIMENT

Figure 7:
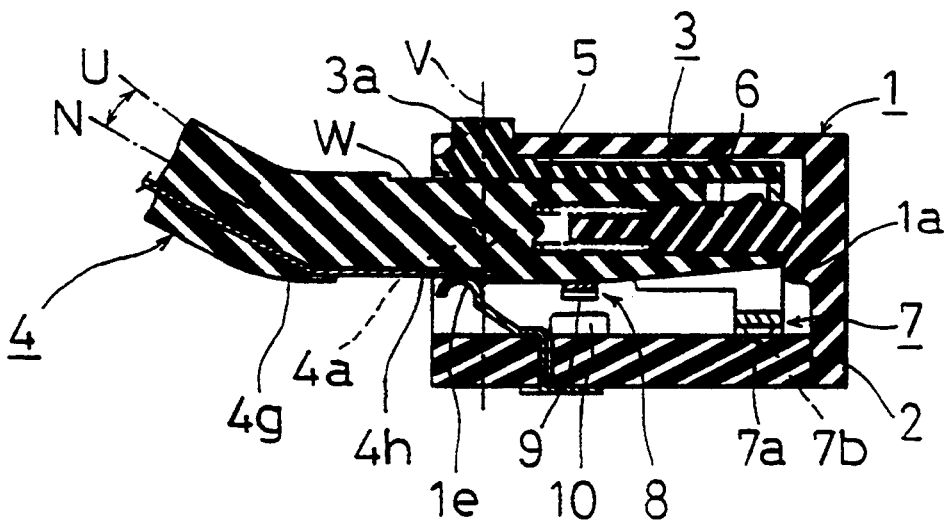
FIG. 7 is a schematic sectional view showing a third embodiment of the present invention.

FIG. 7 shows a third embodiment of the present invention. In this third embodiment, an electric conductor 4g is embedded in the operation lever 4. A part of the electric conductor 4g is exposed in the vicinity of the first contact portion 4a to form a contact 4h which lies flush with the lower surface of the operating lever 4. On the other hand, the electrode 1e mounted on the case 1 is arranged to have sufficient elasticity that a constant connection between the electrode 1d mounted on the case 1 and the contact 4h is maintained irrespective of the pivotal position of the operation lever 4.

FOURTH EMBODIMENT

Figure 8:
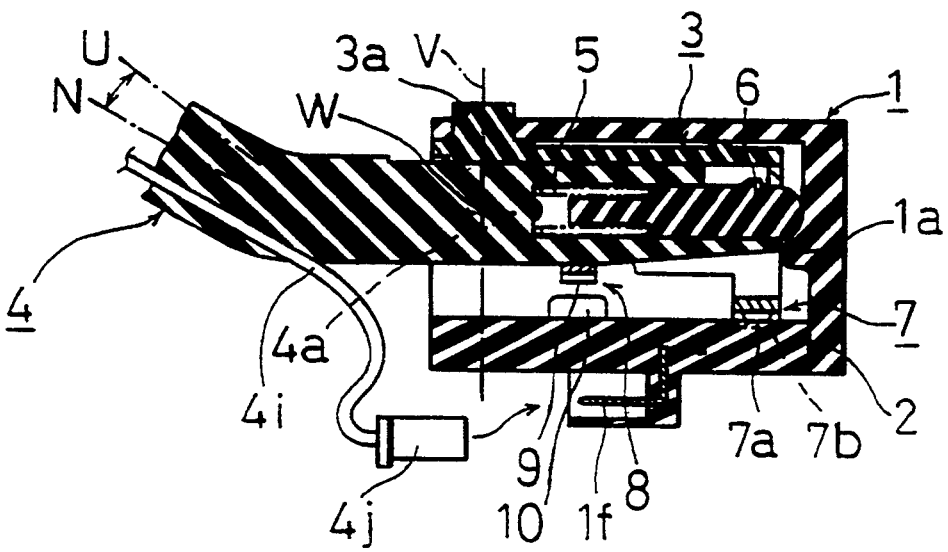
FIG. 8 is a schematic sectional view showing a fourth embodiment of the present invention.

FIG. 8 shows a fourth embodiment of the present invention. In this embodiment, an electrical conductor 4i is embedded in the operation lever 4, and a part of a flexible electrical cable-type conductor 4i is exposed in the vicinity of the first contact portion 4a and provided with a female socket type terminal 4j at its end. On the other hand, the electrode if mounted on the case 1 is arranged to take the form of a male socket type terminal which can be plugged together with the female socket type terminal 4j.

As will be appreciated, the construction and arrangement of the second, third and fourth embodiments is also essentially the same as the first and second. Accordingly, similar parts are designated using like numerals and a detailed explanation thereof is omitted for the sake of brevity.

As mentioned above, the present invention has many advantages as follows:

(1) The number of parts constituting the lever switch can be reduced;

(2) The operation lever may be easily attached to the movable switch element thereby saving manufacturing time;

(3) When a fault occurs in the lever switch and inspection and/or repair is needed, the operation lever may be easily removed from the movable switch element by using a simple tool thereby saving the time required for such checking and/or repairing operation and achieving a removal of the operation lever from the movable switch element without any damage thereof;

(4) There is no need for any process for soldering between the operation lever and the case; and (5) There is achieved a constant electrical connection between the operation lever and the case with regardless of the operational position of the operation lever.

It will be appreciated that although only four embodiments have been disclosed, the present invention is not limited thereto and the various changes and modifications which can be made without departing from the scope of the invention, which is limited only by the appended claims, will be self-evident to one skilled in the art to which the present invention pertains.

What is claimed is:

1. A lever switch assembly comprising:
   a case;
   a movable switch element disposed in said case and pivotally supported on said case so as to be pivotal about a first axis, said movable element having a cavity; and
   an operating lever having an end portion received in said cavity, said operating lever being pivotally supported on said movable switch element by first and second lug members which are coaxially arranged and which extend out from either side of said operating lever so as to be pivotal about a second axis which has a predetermined angled relationship with said first axis, said movable switch element having a pair of integral resilient supporting portions which are each formed with bores in which said first and second lug members are rotatably received, said pair of resilient supporting portions supporting said operating lever so that said operating lever is pivotal about said second axis and so that selective connection and disconnection between said operating lever and said movable switch element is facilitated.

2. A lever switch assembly according to claim 1, wherein said pair of resilient supporting portions comprise finger-like members which extend along opposite sides of said movable switch element to a level proximate an opening therein through which said operating lever passes into said cavity.

3. A lever switch assembly according to claim 1, wherein said movable switch element has a projection which is received in an opening formed in said case, said projection and said opening supporting said movable switch element in said case so as to be pivotal about said first axis.

4. A lever switch assembly according to claim 3, wherein said first axis extends in the direction perpendicular to said second axis, said first and second lug members being aligned along said second axis.

5. A lever switch assembly comprising:
   a manually operable lever, said lever having a pair of cylindrical boss-like support lugs extending from its side surfaces;
   a movable switch element having a cavity into which an end portion of said lever can extend, said movable switch element having a pair of resilient finger-like supporting portions for respectively supporting said pair of support lugs in a manner which renders said lever pivotal about a first axis with respect to said movable switch element, the resiliency of said pair of resilient finger-like supporting portions facilitating connection and disconnection between said lever and said movable switch element; and
   a case in which said movable switch element is enclosed and supported so as to be pivotal about a second axis;
   a first electrical conductor supported on said casing; and
   a second electrical conductor supported on said lever, said second electrical conductor having a portion which is exposed proximate said pair of support lugs and which is electrically contacted with said first electrical conductor.

6. A lever switch assembly according to claim 5, wherein said second electric conductor is at least in part, embedded in said operation lever.

7. A lever switch assembly according to claim 5, said second electrical conductor has a portion which is rotatable about said second axis.

8. A lever switch assembly according to claim 5, said movable switch element has an intermediate conductor member disposed thereon, said intermediate conductors being arranged to be in constant contact with said first electrode and to be in constant engagement with said second electrode irrespective of the pivotal movement of said operation lever.

9. A lever switch assembly according to claim 5, wherein at least one of said first and second conductors is resilient and maintains contact with the other of said first and second conductors irrespective of the pivotal movement of said operation lever about said first axis.

10. A lever switch assembly according to claim 5, wherein one of said first and second conductors is a male plug type terminal element and the other of said first and second contacts is a female plug type terminal.

11. A lever switch assembly according to claim 5, wherein said pair of resilient finger-like supporting portions each have a free end and a bore, the bores being formed near each free end for receiving one of said pair of cylindrical boss-like support lugs of said lever.

12. A lever switch assembly according to claim 5, wherein said first electrical conductor comprises a flat sheet of metal which has a clip shape and which is clipped onto a portion of said casing and wherein said second electrical conductor comprises an essentially L-shaped member which has a rounded portion formed on one leg of said L-shaped member, said rounded portion being located between said first axis and said first conductor and dimensioned such that said rounded portion remains in sliding contact with said first conductor when said lever is pivoted about said first axis, said first and second conductors being so constructed and arranged that said lever can slide into said movable switch element to a position wherein said first and second lugs of said lever are received in the bores formed in said pair of resilient supporting portions.

13. A lever switch assembly according to claim 5, wherein said first electrical conductor comprises a flat sheet of metal has a clip shape and which is clipped onto a portion of said casing and wherein said second electrical conductor comprises a strip of metal which is formed with a rounded hook-like portion at a free end thereof, said rounded hook-like portion being located between said first axis and said first conductor and dimensioned such that said rounded portion remains in sliding contact with said first conductor when said lever is pivoted about said first axis, said first and second conductors being so constructed and arranged that said lever can slide into said movable switch element to a position wherein said first and second lugs of said lever are received in the bores formed in said pair of resilient supporting portions.

14. A lever switch assembly according to claim 5, wherein said second electrical conductor comprises a flat sheet of metal which is in part embedded in said lever and has an exposed surface on the lower surface of said lever; and wherein said first conductor comprises a flat strip of metal which has a rounded hook-like portion formed at a free end thereof, said rounded hook-like portion being located between said first axis and said first conductor and dimensioned such that said rounded hook-like portion remains in sliding contact with said second conductor when said lever is pivoted about said first axis, said first and second conductors being so constructed and arranged that said lever can slide into said movable switch element to a position wherein said first and second lugs of said lever are received in the bores formed in said pair of resilient supporting portions.

* * * * *